UNITED STATES PATENT OFFICE.

AUGUST E. SCHUTTÉ, OF BELMONT, MASSACHUSETTS, ASSIGNOR TO WARREN BROTHERS COMPANY, OF BOSTON, MASSACHUSETTS, A CORPORATION OF WEST VIRGINIA.

BITUMINOUS COMPOSITION.

No. 801,111.  Specification of Letters Patent.  Patented Oct. 3, 1905.

Application filed June 21, 1902. Serial No. 112,677.

*To all whom it may concern:*

Be it known that I, AUGUST E. SCHUTTÉ, a subject of William, Emperor of Germany, having taken out my first naturalization papers as a citizen of the United States, now residing in Belmont, county of Middlesex, and State of Massachusetts, have invented a new and useful Improvement in the Production of Bituminous Compositions, of which the following is a full, clear, and exact description.

The invention relates to the production of bituminous composition especially adapted for use in the construction of pavements or roadways, but which is also capable of other uses.

It consists in combining with a bituminous ingredient, such as pitch distilled from coal or other tar or such, as a more or less pure asphalt, however obtained, a quantity of dry pulverized clay. The amount of the clay to that of the bituminous composition varies according to the quality or purity of the composition or use to which the product is to be put.

In a paving composition, where ordinarily there are present stony or mineral ingredients, there would be required generally a somewhat smaller proportion of the prepared clay than in a roofing composition, for instance; but the quality and purity of the bituminous composition must be considered and also its softness. Ordinarily for a paving composition I employ from about thirty-five to fifty-five per cent. of the dry pulverized clay—that is, where a comparatively pure asphalt is employed. Where a pitch is used, the proportion of clay would be somewhat less, according to the percentage of free carbon present in the pitch. The proportion would then vary from eighteen to thirty-five per cent. of the prepared clay to the pitch.

The prepared clay may be combined with the asphalt, tar, or other bituminous product before, during, or after distillation, as may be most convenient or most desirable.

The value of the invention consists in the modifications of the conditions of use of bituminous compositions in that it increases the range of temperature in which the compositions retain their virtue without their defects— that is, such compositions remain more uniformly flexible and resilient at both extremes of temperature than would the bituminous material from which they are made, having less tendency to become brittle at low temperatures and to soften at high temperatures, but being for bituminous compositions remarkably uniform and stable between the ranges of ordinary atmospheric temperatures.

Having thus fully described my invention, I claim and desire to secure by Letters Patent of the United States—

1. A method of preparing a paving material consisting in thoroughly mixing with semi-liquid bitumen finely-pulverized clay, and stirring into the combination particles of stone or wearing material.

2. A sheet paving material consisting of wearing or strong ingredients combined by an intimate mixture of bitumen and finely-pulverized clay.

AUGUST E. SCHUTTÉ.

In presence of—
  J. M. DOLAN,
  SAUL SIPPERSTEIN.